United States Patent
Kim et al.

(10) Patent No.: US 8,421,768 B2
(45) Date of Patent: Apr. 16, 2013

(54) TOUCH SCREEN DEVICE

(75) Inventors: Woon Chun Kim, Gyunggi-do (KR); Yong Soo Oh, Gyunggi-do (KR); Hyun Jun Kim, Gyunggi-do (KR); Jong Young Lee, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 235 days.

(21) Appl. No.: 12/954,736

(22) Filed: Nov. 26, 2010

(65) Prior Publication Data

US 2012/0038594 A1    Feb. 16, 2012

(30) Foreign Application Priority Data

Aug. 11, 2010 (KR) .................. 10-2010-0077480

(51) Int. Cl.
*G06F 3/041* (2006.01)
(52) U.S. Cl.
USPC ............................................. 345/173; 349/12
(58) Field of Classification Search .......... 345/156, 345/173–181
See application file for complete search history.

(56) References Cited

U.S. PATENT DOCUMENTS 7,589,798 B2 * 9/2009 Takahata et al. ................ 349/12
8,253,692 B2 * 8/2012 Lai ................................. 345/173

FOREIGN PATENT DOCUMENTS

JP   2008-276729   11/2008
JP   2010-020559    1/2010

OTHER PUBLICATIONS

Applicant-provided Office Action issued for Corresponding Japanese Patent Application No. 2010-261083, dated Jul. 24, 2012, and its English Summary, also provided by applicant.

* cited by examiner

*Primary Examiner* — Duc Dinh
(74) *Attorney, Agent, or Firm* — Ladas & Parry LLP

(57) ABSTRACT

Disclosed herein is a touch screen device, including: a first transparent electrode formed on one surface of a first transparent substrate to sense a touched input; a second transparent electrode formed on one surface of a second transparent substrate formed to be opposite to the first transparent electrode to sense a touched input; a display formed on the other surface of the second transparent substrate; a first adhesive layer bonding the first transparent substrate to the second transparent substrate; and a second adhesive layer bonding a first connection part formed on an outer side of first transparent substrate to a second connection part formed on an outer side of the display. The touch screen device directly bonds the first transparent substrate to the display, thereby making it possible to provide a high definition image to a user and to reduce infiltration of moisture or the like.

7 Claims, 2 Drawing Sheets

TOUCH SCREEN DEVICE

CROSS REFERENCE TO RELATED APPLICATION

This application claims the benefit of Korean Patent Application No. 10-2010-0077480, filed on Aug. 11, 2010, entitled "Touch Screen Device", which is hereby incorporated by reference in its entirety into this application.

BACKGROUND OF THE INVENTION

1. Technical Field

The present invention relates to a touch screen device.

2. Description of the Related Art

With the continuous development in the electronic technology and the information technology fields, the relative importance of electronic devices is constantly increasing in everyday life, including work environment. In particular, as electronic technology continuously develops, personal computers, portable transmitters etc. process texts and graphics, using a variety of input devices, such as a keyboard, a mouse, a digitizer, etc. These input devices, however, have been developed in consideration of the expanding usage of personal computers, such that they are difficult to be applied to portable devices that are recently reduced in size and thickness. Therefore, touch screens are on the rise as an input device appropriate for the portable devices.

Touch screens, devices generally installed in display devices to detect positions on the screen touched by a user and control electronic devices, using information on the detected contact position as input information, in addition to controlling the screen of the display, have various advantages of being simply operated with little malfunction in a small space, while being very compatible with IT devices.

Meanwhile, with the development of the mobile communication technology, a need exists for a larger display screen in portable devices having a limited size, such that a display device using a touch screen has become the main focus. The touch screen combines a screen and coordinate input units, thereby saving space as compared to a key input scheme according to the prior art. Therefore, a display device recently developed uses a display adopting a touch screen in order to more improve a screen size and user convenience.

FIG. 1 is a cross-sectional view of a resistive touch screen device 10 according to the prior art. Hereinafter, the resistive touch screen device 10 according to the prior art will be described with reference to the figure.

As shown in FIG. 1, the resistive touch screen device 10 according to the prior art includes two sheets of transparent substrates 12, indium tin oxide (ITO) electrodes 13, a touch screen 11 including a first double-sided adhesive tape (DAT) 14, a display 15, and a second double-sided adhesive tape 16.

Herein, the ITO electrodes 13 are formed on the respective transparent substrates 12, wherein the ITO electrodes 13 are connected to the electrodes 17 to be applied with voltage. Further, the outer sides between the two sheets of transparent substrates 12 are bonded by the first double-sided adhesive layer 14 and dot spacers 18 are formed on the inner lower ITO electrode 13b between the transparent substrates 12. In addition, the display 15 is bonded to the lower transparent substrate 120b by the second double-sided adhesive tape 16, wherein the second double-sided adhesive tape 16 is formed on the outer sides between the lower transparent substrate 12b and the display 15.

Meanwhile, when a user applies pressure to the upper transparent substrate 12a so as to input an object, the upper transparent substrate 12a and the upper ITO electrode 13a are bent to face the lower transparent substrate 12b and resistance varied while the upper ITO electrode 13a are in contact with the lower ITO electrode 13b are sensed, thereby achieving coordinates of the input positions.

However, in the resistive touch screen device 10 according to the prior art, the second double-sided adhesive tape 16 is formed on the outer sides between the touch screen 11 and the display 15 so that an air layer 19 is formed on inner sides between the touch screen 11 and the display 15. Therefore, an image displayed from the lower display 15 is not definitively transmitted to a user. In other words, transmittance of the image is degraded and optical path difference is generated due to the air layer 19, such that Newton's rings or the like occurs.

In addition, the touch screen device 10 has at least four junction interfaces exposed to the outside, which are relatively numerous, such that moisture, oil, or the like is infiltrated into the inside of the touch screen device 10. More specifically, the junction interface is formed at fours areas, which are between the upper transparent substrate 12a and the first double-sided adhesive tape 14, between the first double-sided adhesive tape 14 and the lower transparent substrate 12b, between the lower transparent substrate 12b and the second double-sided adhesive tape 16, and between the second double-sided adhesive tape 16 and the display 15. The junction interface is relatively highly likely to be infiltrated with moisture, oil or the like, such that the touch screen device 10 is more frequently damaged due to the infiltrated moisture, oil or the like.

SUMMARY OF THE INVENTION

The present invention has been made in an effort to provide a touch screen device that removes an air layer between a touch screen and a display to provide a high definition image to a user.

The present invention has been also made in an effort to provide a touch screen device that reduces the number of junction interfaces exposed to the outside to prevent infiltration of moisture or oil into the inside of the touch screen.

A touch screen device according to a preferred embodiment of the present invention includes: a first transparent electrode formed on one surface of a first transparent substrate to sense a touched input; a second transparent electrode formed on one surface of a second transparent substrate formed to be opposite to the first transparent electrode to sense a touched input; a display formed on the other surface of the second transparent substrate; a first adhesive layer bonding the first transparent substrate to the second transparent substrate; and a second adhesive layer bonding a first connection part formed on an outer side of first transparent substrate to a second connection part formed on an outer side of the display.

Herein, the first transparent electrode and the second transparent electrode include a conductive polymer.

The first adhesive layer bonds a third connection part formed on an inner side of the first connection part on the first transparent substrate to a fourth connection part formed on the outer side of the second transparent substrate.

When the touched input is applied, the first transparent electrode and the second transparent electrode are in contact with each other to sense a change in resistance or voltage.

When the touched input is applied, the first transparent electrode and the second transparent electrode sense a change in capacitance.

The touch screen device further includes a first electrode formed on the first connection part on the first transparent substrate; and a second electrode formed on the fourth connection part on the second transparent substrate.

The touch screen device further includes a first electrode formed on the third connection part on the first transparent substrate; and a second electrode formed on the fourth connection part on the second transparent substrate.

An outer surface of the first adhesive layer and an inner surface of the second adhesive layer are in contact with each other.

DESCRIPTION OF THE PREFERRED EMBODIMENTS

Figure 1:
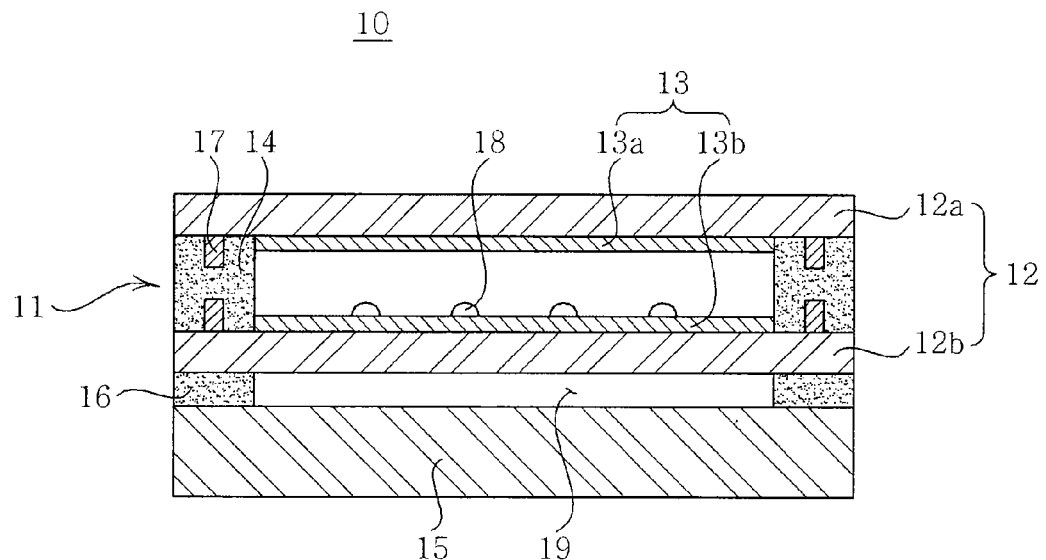
FIG. 1 is a cross-sectional view of a resistive touch screen device according to the prior art.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Structure of Touch Screen

First Embodiment

Figure 2:
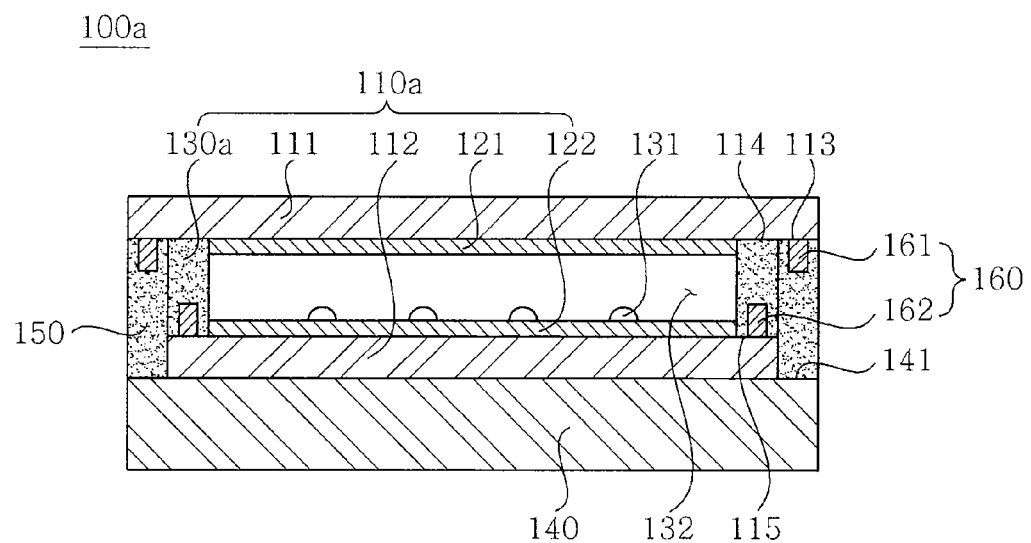
FIG. 2 is a cross-sectional view of a touch screen device according to a first preferred embodiment of the present invention.

FIG. 2 is a cross-sectional view of a touch screen device 100a according to a first preferred embodiment of the present invention. Hereinafter, the touch screen device 100a according to the present embodiment will be described with reference to the figure.

As shown in FIG. 2, the touch screen device 100a according to the present embodiment includes a touch screen 110a including a first transparent substrate 111, a first transparent electrode 121, a second transparent substrate 112, a second transparent electrode 122, and a first adhesive layer 130a, a display 140, and a second adhesive layer 150 bonding the touch screen 110a to a display 140.

Herein, the present embodiment will describe a case in which the touch screen 110a is a resistive type.

The first transparent substrate 111, which is a member receiving a touched input from a specific object such as a user's body, a stylus pen or the like, provides a space formed on one surface thereof, the space on which the first transparent electrode 121 is formed.

In this configuration, it is preferable that the first transparent substrate 111 is made of a material having elasticity so that it is bent by receiving a touched input and is returned to its original position when the touched input is released. In addition, since the first transparent substrate 111 receives the touched input from a specific object such as a user's body, a stylus pen or the like, it is preferable that the first transparent substrate 111 is made of a material having a large durability so that other configuration of the touch screen 110a can be sufficiently protected from external force. In addition, it is preferable that the first transparent substrate 111 is made of a transparent material so that an image from the display 140 installed at the lower portion of the touch screen 110a can be definitively transmitted to a user. The first transparent substrate 111 may, for example, be made of polyethyleneterephthalate (PET), polycarbonate (PC), polymethylmetacrylate (PMMA), polyethylenenaphthalate (PEN), polyethersulfone (PES) or cyclic olefin copolymer (COC). Besides, glass or tempered glass may be generally used.

In addition, a first connection part 113 may be formed on the outermost side of the first transparent substrate 111 and the second adhesive layer 150 to be described below may be formed on the first connection part 113. In addition, a third connection part 114 may be formed on a right inner side of the first connection part 113 and the first adhesive layer 130a to be described below may be formed on the third connection part 114.

In addition, a separate window plate (not shown) is formed on an upper portion of the first transparent substrate 111, thereby making it possible to protect other components of the touch screen 110a from external force. At this time, the window plate (not shown) may be made of, for example, polyethyleneterephthalate (PET), similar to the first transparent substrate 111.

Meanwhile, the transparent electrode 121 is formed on one surface of the first transparent substrate 111, such that it is preferable for the first transparent substrate 111 to be subject to high-frequency treatment or primer treatment in order to improve adhesion with the transparent electrode 121.

The second transparent substrate 112, which is a member positioned on the bottom of the touch screen 110a, provides a space on which the second transparent electrode 122 is formed.

In this configuration, the second transparent substrate 112 may be spaced apart from the first transparent substrate 111 to be opposite to each other. Therefore, a predetermined space, that is, an air gap, may be formed between the first transparent substrate 111 and the second transparent substrate 112. In addition, the second transparent substrate 112 may be formed to be narrower than the first transparent substrate 111. More specifically, a fourth connection part formed 115 on an outermost side of the second transparent substrate 112 is bonded to the third connection part 114 of the first transparent substrate 111 by the first adhesive layer 130a, such that the second transparent substrate 112 may be formed to be narrower than the first transparent substrate 111 by the width of the first connection part 113.

Meanwhile, the second transparent substrate 112 may be made of, for example, polyethyleneterephthalate (PET), glass or the like, similar to the first transparent substrate 111.

The first transparent electrode 121 and the second transparent electrode 122 are members that are formed on one surface of each of the first transparent substrate 111 and the second transparent substrate 112 and are in contact with each other at the time of touched input to sense a change in resistance or voltage.

In this case, it is preferable that the first transparent electrode 121 and the second transparent electrode 122 are made of a transparent material so that a user can see the display 140 under the touch screen 110a and are made of a material having conductivity. For example, the transparent electrode 121 and the second transparent electrode 122 may be made of a conductive polymer containing poly-3,4-ethylenedioxythiophene/polystyrenesulfonate (PEDOT/PSS), polyaniline alone or a mixture thereof, or metal oxides, such as indium tin oxide (ITO). In this case, when the first transparent electrode 121 is made of a conductive polymer, it is flexible, thereby making it possible to reduce defects even though the first transparent electrode 121 is frequently bent towards the second transparent substrate 112 by the touched input. In addition, flexibility of the first transparent substrate 111 becomes large to be bendable at the time of a touched input, that is, a curvature radius becomes small, thereby making it possible to accurately measure coordinates. In the case of the conductive polymer, the first transparent electrode 121 and the second transparent electrode 122 may be formed on the first transparent substrate 111 and the second transparent substrate 112 through a silk screen printing method, an inkjet printing method, a gravure printing method, an offset printing method, or the like.

Meanwhile, when a touched input is generated, the first transparent electrode 121 may be in direct contact with the second transparent electrode 122 to be electrically connected thereto. More specifically, the first transparent substrate 111 and the first transparent electrode 121 are bent towards the second transparent substrate 112 by pressure at the time of touched input by a specific object such as a user's body, a stylus pen, or the like. Thereby, the first transparent electrode 121 and the second transparent electrode 122 are in direct contact with each other to generate a change in resistance of voltage. A controller (not shown) may recognize the pressed coordinates based thereon. In addition, the controller (not shown) may implement a desired operation by recognizing the coordinates of the pressed positions.

In addition, the first transparent electrode 121 and the second transparent electrode 122 may be configured of, for example, X-axis patterns and Y-axis patterns, and be configured to have a bar shape in which the patterns are orthogonal to each other, thereby making it possible to more definitively sense the touched input. However, the present invention is not limited thereto but the first transparent electrode 121 and the second transparent electrode 122 may have various shapes, such as a triangular shape, a diamond shape, or the like.

The first adhesive layer 130a is a member that is formed on the third connection part 114 of the first transparent substrate 111 and the fourth connection part 115 of the second transparent substrate 112 to bond the first transparent substrate 111 to the second transparent substrate 112.

In this case, the first adhesive layer 130a is formed to connect the third connection part 114 of the first transparent substrate 111 to the fourth connection part 115 of the second transparent substrate 112, such that an opening 132 that is an air gap may be formed on the inner side of the first adhesive layer 130a. At this time, the reason why the adhesive layer 130a is not formed on the inner side between the first transparent substrate 111 and the second transparent substrate 112 is to allow the first transparent electrode 121 to be in direct contact with the second transparent electrode 122 at the time of the touched input. In addition, since the first adhesive layer 130a is a member that is formed on the relatively outer side of the touch screen 110a, that is, in a bezel region, it is not always required to be a transparent member. Therefore, as the first adhesive layer 130a, for example, a double-sided adhesive tape (DAT) may be used.

Meanwhile, a dot spacer 131 may further be formed on the second transparent electrode 122 in the opening 132. The dot spacer 131 relieves the impact generated when the first transparent electrode 121 is in contact with the second transparent electrode 122 and provides repulsive force so that the first transparent substrate 111 is returned to its original position when the pressure is released. In addition, the dot spacer 131 usually serves to maintain insulation between the first transparent electrode 121 and the second transparent electrode 122 so that the first transparent electrode 121 is not in contact with the second transparent electrode 122 when there is no external pressure.

The display 140, which is a member to display an image to a user, is formed to be connected to the second transparent substrate 112.

In this case, the display 140 is an element showing images for transmitting information to the user and showing reaction when the user touches the touch screen 110a to the user. The display 140 may be, for example, a liquid crystal display (LCD), a plasma display panel (PDP), an electroluminescence (EL), a cathode ray tube (CRT) or the like.

As an example, when the display 140 is configured of the thin film transistor (TFT) liquid crystal display, the display 140 may be configured to include a lower plate on which a thin film transistor and a pixel electrode are arranged, an upper plate including a color filter representing colors and a common electrode, and liquid crystals filled between the upper plate and the lower plate. In addition, polarizing plates linearly polarizing a visible ray (natural light) each may be attached onto the upper plate and the lower plate.

The second adhesive layer 150 is a member that directly connects the first transparent substrate 111 to the display 140.

In this case, the second adhesive layer 150 may be formed to directly connect the first connection part 113 of the first transparent substrate 111 to the second connection part 141 of the display 140. In addition, since the third connection part 114 is on the inner side of the first connection part 113 in the first transparent substrate 111, the inner surface of the second adhesive layer 150 may be formed to be in contact with the outer surface of the first adhesive layer 130a.

In addition, the second transparent substrate 112 is formed to be narrower than the first transparent substrate 111 by the width of the first connection part 113. Therefore, when the second adhesive layer 150 directly connects the first transparent substrate 111 to the display 140, the second transparent substrate 112 may not be exposed to the outside of the touch screen device 100a. More specifically, the second transparent electrode 122 and the opening 132 of the first adhesive layer 130a are formed on the upper surface of the second transparent substrate 112, the display 140 is formed to be in contact with the lower surface of the second transparent substrate 112, and the second adhesive layer 150 is formed on the outer surface of the second transparent substrate 112, such that the second transparent substrate 112 may not be exposed to the outside.

Meanwhile, the second adhesive layer 150 directly connects the first transparent substrate 111 to the display 140, such that the number of junction interfaces exposed to the outside may be reduced to two. More specifically, the junction interface is formed only between the first transparent substrate 111 and the second adhesive layer 150 and between the second adhesive layer 150 and the display 140, thereby making it possible to reduce infiltration of moisture or oil due to user's sweat or the like into the junction interface. In particular, when the first transparent electrode 121 and the second transparent electrode 122 are made of an aqueous conductive polymer, for example, poly-3,4-ethylenedioxythiophene/polystyrenesulfonate (PEDOT/PSS), it is possible to reduce a phenomenon that moisture is infiltrated into the first transparent electrode 121 and the second transparent electrode 122 to increase surface resistance thereof.

In addition, since the second adhesive layer 150 directly bonds the display 140 to the first transparent substrate 111, the display 140 can be fixed to the touch screen 110a even though a separate adhesive layer is not formed between the second transparent substrate 112 and the display 140. In addition, since a separate adhesive layer is not formed, the display 140 may be formed to be in contact with the second transparent substrate 112, thereby making it possible to remove an air layer between the touch screen 110a and the display 140. Therefore, the touch screen device 100a may be thin by the thickness of the air layer. In addition, since the air layer between the touch screen 110a and the display 140 is removed, a phenomenon that an image from the display 140 is distorted, for example, the phenomenon of Newton's rings or the like, is reduced, thereby making it possible to transmit a high definition image to a user.

Meanwhile, since the second adhesive layer 150 is formed at the outermost side of the touch screen device 100a as compared to the first adhesive layer 130a, the second adhesive layer 150 is formed in a bezel region of the touch screen device 100a, and may be formed of, for example, a double-sided adhesive tape (DAT).

Meanwhile, a first electrode 161 and a second electrode 162 each applying voltage to the first transparent electrode 121 and the second transparent electrode 122 may further be formed on the touch screen device 100a.

In this case, it is preferable that the first electrode 161 and the second electrode 162 are made of a material having excellent electrical conductivity so that the first electrode 161 supplies voltage to the first transparent electrode 121 and the second electrode 162 supplies voltage to the second transparent electrode 122, respectively. Therefore, the first electrode 161 and the second electrode 162 may be made of, for example, a material composed of silver (Ag) paste or organic silver.

Meanwhile, the second electrode 162 may be formed on the fourth connection part 115 of the second transparent substrate 112 to be electrically connected to the second transparent electrode 122, and the first electrode 161 may be formed on the first connection part 113 or the third connection part 114 of the first transparent substrate 111 to be electrically connected to the first transparent electrode 121. In particular, when the first electrode 161 is formed on the first connection part 113, the first electrode 161 and the second electrode 162 are not disposed on one vertical line but are crossed, thereby making it possible to reduce the thickness of the touch screen 110a. More specifically, since the height of the electrode 160 is generally higher than that of the transparent electrode 160, the first electrode 161 and the second electrode 162 are crossed, thereby making it possible to reduce the thickness of the touch screen 110a.

Structure of Touch Screen

Second Embodiment

Figure 3:
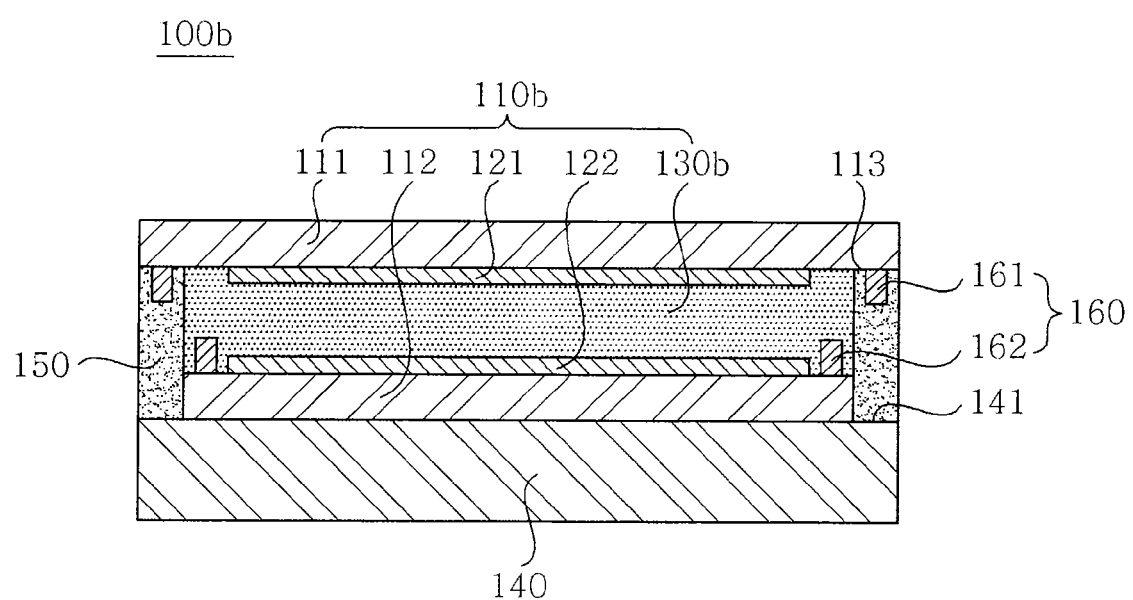
FIG. 3 is a cross-sectional view of a touch screen device according to a second preferred embodiment of the present invention.

FIG. 3 is a cross-sectional view of a touch screen device 100b according to a second preferred embodiment of the present invention. Hereinafter, the touch screen device 100b according to the present embodiment will be described with reference to the figure. Herein, like reference numerals will designate like or corresponding components and the description overlapping with the first embodiment will be omitted.

As shown in FIG. 3, the touch screen device 100b according to the present embodiment includes a touch screen 110b including a first transparent substrate 111, a first transparent electrode 121, a second transparent substrate 112, a second transparent electrode 122, and a first adhesive layer 130b, a display 140, and a second adhesive layer 150 bonding the touch screen 110b to a display 140.

Herein, the present embodiment will describe a case in which the touch screen 110b is a capacitive type.

The first transparent electrode 121 and the second transparent electrode 122 are members that are formed on one surface of each of the first transparent substrate 111 and the second transparent substrate 112 and sense a change in capacitance at the time of touched input.

In this case, the first transparent electrode 121 and the second transparent electrode 122 are each formed of, for example, X-axis patterns and Y-axis patterns, to measure parasitic capacitance from the touched input and to sense the change in capacitance, thereby transferring them to a controller (not shown). The controller (not shown) recognizes coordinates of the pressed positions to implement a desired operation. More specifically, when a high frequency is diffused over the first transparent electrode 121 and the second transparent electrode 122 by being applied with voltage from the first electrode 161 and the second electrode 162 and then a touched input is generated, a predetermined change is generated in capacitance as the first transparent electrode 121 and the second transparent electrode 122 are used as electrodes and the first transparent substrate 111 or a window plate (not shown) is used as dielectric material. The controller (not shown) senses the changed waveform, thereby making it possible to recognize the touched positions or whether the touch is generated or not.

The first adhesive layer 130b is a member bonding the first transparent substrate 111 to the second transparent substrate 112.

In this case, the first adhesive layer 130b is formed over between the first transparent substrate 111 and the second transparent substrate 112, thereby making it possible to entirely bond the first transparent substrate 111 to the second transparent substrate 112. In addition, since the first adhesive layer 130b is formed over the first transparent substrate 111 and the second transparent substrate 112, it is preferable that the first adhesive layer 130b is made of a transparent material having adhesion, for example, an optically clear adhesive. Therefore, the first adhesive layer 130b may be made of a transparent adhesive, for example, silicons, polyurethanes, acrylic adhesives, or the like.

Meanwhile, in the capacitive touch screen 110b, the first transparent electrode 121 is not in direct contact with the second transparent electrode 122. Therefore, even though the first adhesive layer 130b is formed over between the first transparent substrate 111 and the second transparent substrate 112, it does not affect the operation of the touch screen device 100b.

The touch screen device according to the present invention directly bonds the first transparent substrate to the display using the second adhesive layer, such that a separate adhesive layer is not required between the second transparent substrate and the display and the air layer is not formed between the second transparent substrate and the display, thereby making it possible to definitively transmit an image displayed from the display to a user.

In addition, according to the present invention, the second transparent substrate is installed on the inner side of the second adhesive layer to reduce the number of junction interfaces exposed to the outside of the touch screen device to two, thereby making it possible to reduce the infiltration phenomenon of moisture and oil.

In addition, according to the present invention, the second transparent substrate is in contact with the display, thereby making it possible to make the touch screen device thin.

In addition, according to the present invention, the first electrode is formed on the first connection part on the first transparent substrate and the second electrode is formed on the fourth connection part on the second transparent substrate so as to cross the first electrode and the second electrode, thereby making it possible to reduce the thickness of the touch screen.

Although the preferred embodiments of the present invention have been disclosed for illustrative purposes, they are for specifically explaining the present invention and thus a touch screen device according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A touch screen device, comprising:
    a first transparent electrode formed on one surface of a first transparent substrate to sense a touched input;
    a second transparent electrode formed on one surface of a second transparent substrate formed to be opposite to the first transparent electrode to sense a touched input;
    a display formed on the other surface of the second transparent substrate;
    a first adhesive layer bonding the first transparent substrate to the second transparent substrate; and
    a second adhesive layer bonding a first connection part formed on an outer side of first transparent substrate to a second connection part formed on an outer side of the display,
    wherein the first adhesive layer bonds a third connection part formed on an inner side of the first connection part on the first transparent substrate to a fourth connection part formed on the outer side of the second transparent substrate.

2. The touch screen device as set forth in claim 1, wherein the first transparent electrode and the second transparent electrode include a conductive polymer.

3. The touch screen device as set forth in claim 1, wherein when the touched input is applied, the first transparent electrode and the second transparent electrode are in contact with each other to sense a change in resistance or voltage.

4. The touch screen device as set forth in claim 1, wherein when the touched input is applied, the first transparent electrode and the second transparent electrode sense a change in capacitance.

5. The touch screen device as set forth in claim 1, further comprising:
    a first electrode formed on the first connection part on the first transparent substrate; and
    a second electrode formed on the fourth connection part on the second transparent substrate.

6. The touch screen device as set forth in claim 1, further comprising:
    a first electrode formed on the third connection part on the first transparent substrate; and a second electrode formed on the fourth connection part on the second transparent substrate.

7. The touch screen device as set forth in claim 1, wherein an outer surface of the first adhesive layer and an inner surface of the second adhesive layer are in contact with each other.

* * * * *